United States Patent [19]

Jones

[11] Patent Number: 4,948,244

[45] Date of Patent: Aug. 14, 1990

[54] ROTATABLE, MULTI-FOCUS EYE GLASSES

[76] Inventor: Billy R. Jones, #23 Saddle Club Dr., Midland, Tex. 79703

[21] Appl. No.: 373,251

[22] Filed: Jun. 29, 1989

[51] Int. Cl.⁵ .............................................. G02C 7/08
[52] U.S. Cl. ........................................ 351/57; 351/84
[58] Field of Search ....................... 351/49, 54, 57, 84

[56] References Cited

FOREIGN PATENT DOCUMENTS 615798 10/1926 France ................................... 351/54
506064 12/1954 Italy ...................................... 351/49

Primary Examiner—Rodney B. Bovernick
Attorney, Agent, or Firm—Marcus L. Bates

[57] ABSTRACT

Rotatable, multiple lens eye glasses having a frame by which a lens body is supported and by which the eye glasses are adapted to be worn by a person. The frame includes a circumferentially extending U-shaped channel member which rotatably receives a lens body therewithin. Means on said lens body for imparting rotation thereto. Said lens body having a plurality of magnifying lenses formed thereon, whereby rotation of the lens body brings a selected power lens into alignment with the eyes.

4 Claims, 1 Drawing Sheet

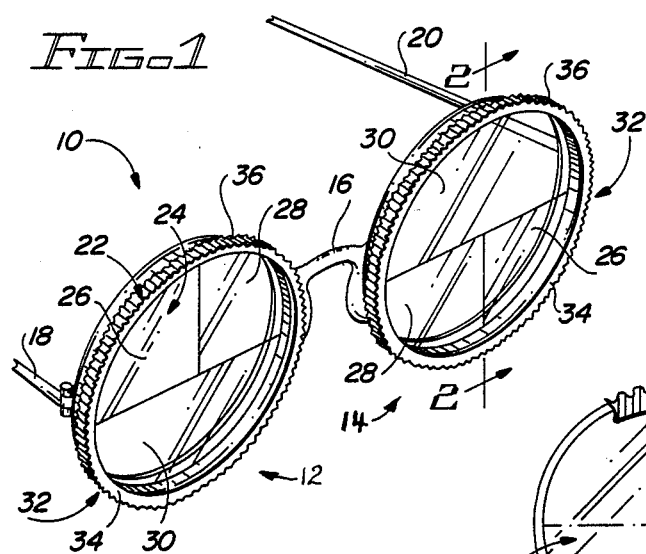
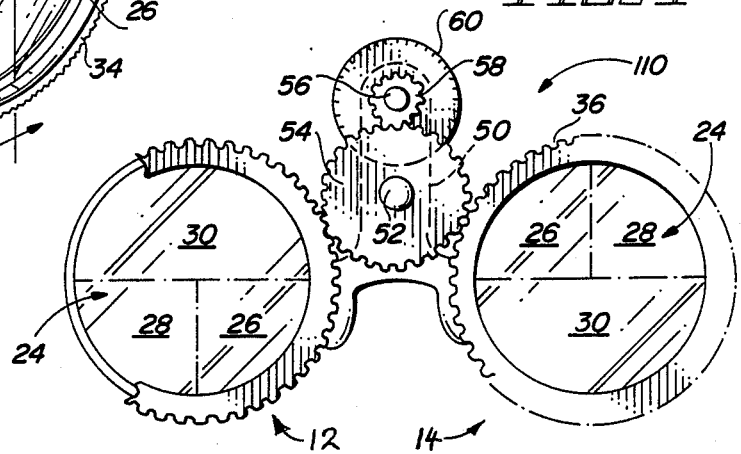
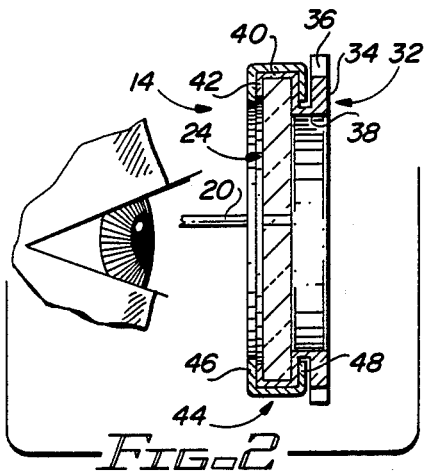
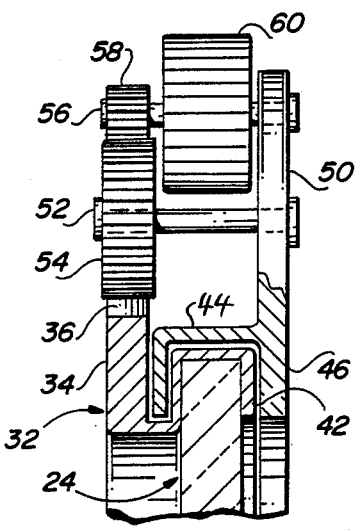
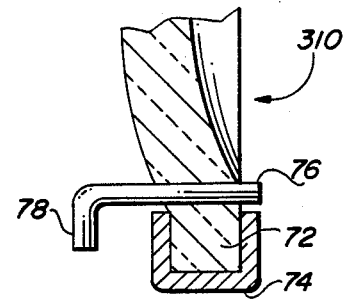
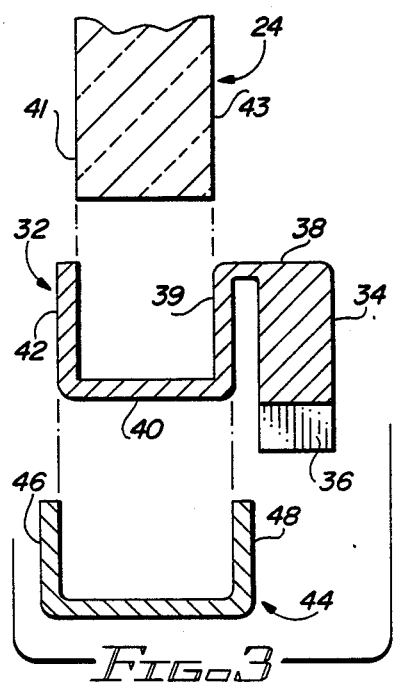
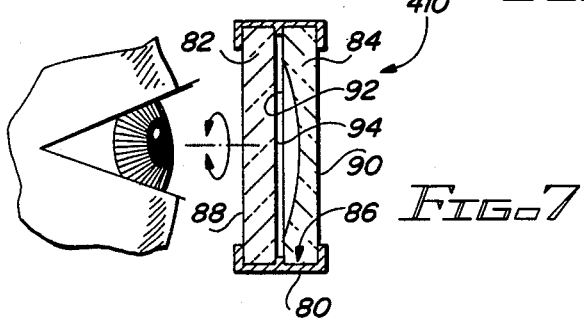

ROTATABLE, MULTI-FOCUS EYE GLASSES

BACKGROUND OF THE DISCLOSURE

Many people have difficulty properly focusing their eyes on near objects and especially focusing on an object within reading distance. It is frustrating to be working simultaneously on a project that requires near and distance vision or near and mid-range vision because differential focal lengths are involved, and this usually requires different lenses for proper focusing of eyes needing correction.

Moreover, where bifocal eyeglasses are worn, it is customary for the close or reading lens to be located in the lower part of the glasses while the more distant vision lens is in the upper part of the lens body of the eye glasses. This is a disadvantage for many commercial users, such as mechanics who must look up towards a mechanism, or for airplane pilots who must look overhead at very close instruments and down for more distant instruments and then look out of the airplane for scrutinizing air traffic or ground activity.

It would be desirable to have made available eye glasses having multi-focal lenses than can be rotated to bring an appropriate power lens into use. Such an apparatus is the subject of the present invention.

SUMMARY OF THE INVENTION

This invention relates to multi-focus eye glasses and especially to eye glasses having a lens holder that is rotatably received within a fixed outer support rim and can be rotated to bring one of a plurality of lenses into a particular position respective to the eye. The lenses are radially spaced from the central axis of a lens body and the outer periphery of the lens body is slidably captured within the support rim and can be mechanically or manually rotated respective thereto.

In one embodiment of the invention, a gear train is connected to simultaneously rotate both of the lens bodies in indexed relationship respective to one another and to the eyes to thereby bring an appropriate power lens into alignment with the eyes to thereby enhance vision.

A primary object of the present invention is the provision of eye glasses having a multi-focus lens body rotatably mounted within a frame in a manner to enable lenses of different magnifications to be selectively positioned in front of the eyes.

Another object of the invention is to provide a multi-focal lens body having a plurality of lenses, each having diverse optical properties and arranged so that a selected lens can be positioned in front of the eyes by tilting the head to thereby bring one of the plurality of lenses in front of the eyes.

A still further object of this invention is the provision of eye glasses having a frame within which there is rotatably mounted a lens body, wherein the lens body has a plurality of lenses, each having diverse magnification characteristics whereby rotation of the lens body brings selected ones of the lenses in front of the eye.

An additional object of the present invention is the provision of concentric lenses individually held rotatably within a frame, each lens having different optical properties, for enhancing near and far vision.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 1 is a perspective view showing eye glasses made in accordance with the present invention;

FIG. 2 is an enlarged, cross-sectional view taken along line 2—2 of FIG. 1;

FIG. 3 is a partially exploded, perspective view of FIG. 2;

FIG. 4 is a front view of an alternate embodiment of the present invention, with some parts being broken away therefrom in order to disclose additional details thereof;

FIG. 5 is a part cross-sectional, fragmentary, isolated side view of part of the apparatus disclosed in FIG. 4;

FIG. 6A sets forth another embodiment of the present invention;

FIG. 6B sets forth still another embodiment of the present invention: and;

FIG. 7 is a cross-sectional view that sets forth another embodiment of the present invention.

DETAILED DESCRIPTION OF THE PREFERRED EMBODIMENTS

FIG. 1 sets forth eye glasses 10 having a right and left lens assembly 12 and 14, made in accordance with the present invention. A nose piece 16 bridges the lens assemblies in the usual manner, and holds them in the illustrated relative position respective to one another. Legs or ear pieces 18 and 20 extend rearwardly whereby the eye glasses can be supported from the nose and ears in the usual manner.

The eye glasses 10 include a main frame having a novel lens holder 22. A multi-focal lens body 24 is rotatably held within lens holder 22 as will be more fully described hereinafter. The lens body 24 preferably is a unitary body of transparent glass or plastic, of suitable chemical composition and quality, and appropriate optical characteristics having a plurality of lenses 26, 28, 30 of diverse optical properties ground thereon.

In the preferred embodiment of the invention, the lens body comprises three lenses 26–30 formed thereon, with there being a reading lens 26 for near objects, a mid-range lens 28 for mid-range objects, and a distance lens 30 for far off objects.

As seen in FIGS. 1, 2 and 3, the outer periphery of the lens holder 22 is provided with an outer annular member 32 that includes an outwardly extending manipulating member 34 having an outer peripheral circumferentially extending edge 36 that can be engaged by the fingers. The outer marginal edge 36 can be in the form of gear-like teeth to enhance grasping the circumference of the lens holder 22 with the fingers.

In FIGS. 2 and 3, a bridge portion 38 interconnects member 34 with a U-shaped inner member 39, 40, 42. Part 40 is an inner bridge that is attached in fixed relationship to the outer periphery of the lens while the legs 39, 42 of the member bear against opposed faces 41, 43 at the outer marginal edge portion of the lens body 24.

A channel guide 44 of U-shaped configuration, having opposed faces formed by the opposed legs 46, 48 slidably receives the lens holder 22 or 32 in low friction relationship therewithin and provides a support for the lens body 24 and lens holder 22 and 32.

FIG. 4 discloses an elevational view of a more complex form of the present invention wherein the before mentioned lens holders 22 and 32 are provided with gear teeth at 36. A standard or gear support framework 50 is attached to the frame or U-shaped channel guide 44 at 46 and extends upward in the manner of FIGS. 4 and 5. A gear shaft 52 rotatably secures gear 54 respective to the framework and simultaneously engages the gear teeth 36 of the lens assemblies 12 and 14. Gear shaft 56 supports a small gear 58 that is affixed to a large wheel 50 which are all connected together to form a gear train whereby one's finger can engage and move the outer periphery of gear wheel 60 wherein, movement of gear wheel 60 rotates gear 58 which in turn rotates gear 54 which in turn rotates the gear teeth 36 of the right and left lens holders 22, 32 of the lens assemblies 12 and 14.

In the alternate embodiment set forth in FIG. 6A, numeral 210 indicates a modification wherein the outer marginal peripheral edge surface of the lens body is directly received within the fixed U-frame 62. A lens rotator 64 is attached at 66 to the outer circumferentially extending marginal edge portion of the lens body. The lens rotator is an outwardly directed skirt 68 that is attached at 66 and is slidably received against an inner face of the U-shaped channel at 70 in low friction relationship therewith.

FIG. 6B, as indicated by numeral 310, discloses another embodiment of the invention, wherein the outer marginal edge 72 of the lens is slidably received for rotation within a U-shaped channel frame member 74. A plurality of pins 76 extend through the lens and are radially spaced from the central axis of the lens. The free marginal end of the pin is outwardly turned along a radius as indicated by numeral 78.

In the embodiment 410 of FIG. 7, a frame 80 rotatably captures a pair of axially aligned superimposed lenses 82, 84 therewithin. The frame forms an annulus 86 that receives the circumferentially extending marginal edge portions of the lenses therein. The outer surfaces 88, 90 of the lens assembly are opposed to one another and the inner surfaces 92, 94 thereof confront one another. The assembly 410 represents one of a pair of lens assemblies, such as seen in FIG. 2, which can be connected as seen at 22, 32 in FIG. 1 for example.

The dual lens assembly of FIG. 7 can advantageously be used by rendering one of the lenses 82 or 84 fixed respective to the frame 80 while the other lens is made rotatable within the frame. Either lens can have a plurality of magnifications built therein as seen at 26, 28 and 30 of FIGS. 1 or 4. Relative rotation of the lenses 82, 84 provide a large selection of different powers of magnification.

In operation of the first embodiment as set forth in FIGS. 1, 2 and 3, a person wearing the eye glasses 10 can selectively view through either of the lenses 26, 28, or 30 in the following manner:

The lens body 24 can be oriented in the illustrated manner of FIG. 1 whereby lens 30 is used for far vision, and by tilting the head and looking either up or down, one of the other lenses 26 or 28 can be utilized for intermediate or close range.

On the other hand, under some conditions of occupational needs, the lens body can be rotated 180 degrees, bringing lens 30 into the lower position of the frame and the intermediate and close lens into the upper position.

Alternatively, the lens 26 or 28 can be adjusted whereby either one is located at the very bottom or very top of the frame.

In one embodiment, the lens body is rotated by grasping the outer rim at 36 and rotating the outer lens holder 22, 32 respective to the fixed U-shaped rim 44 of the frame.

In the embodiment of FIGS. 4 and 5, both of the indexed lens bodies are simultaneously rotated by placing the finger on the outer periphery of gear wheel 60 and moving the wheel in a clockwise or counterclockwise direction in order to successively bring the desired power lens 26, 28, 30 into aligned relationship with the eyes for viewing things that may be either close up or far away.

In the embodiment 210 of FIG. 6, the lens apparatus is manipulated by touching member 68 with the tips of the fingers and rotating the member respective to frame 62 to acquire the proper lens power as in the before described manner.

The alternate embodiment indicated by numeral 310 is similarly manipulated by touching and pushing one of a plurality of pins 78 with the tips of the fingers and rotating the lens body to selectively bring an individual lens 26, 28, 30 in front of the eyes to enhance vision.

I claim:

1. Eyeglasses having rotatable multiple lens holders; each of said holders having a lens frame by which a lens body is supported; a main frame by which the eye glasses are adapted to be worn by a person; said main frame includes a fixed support member circumferentially extending and rotatably receiving said lens frame therewithin; said lens body has multiple lens formed thereon;

means connected to said lens frame for imparting relative rotation thereto respective to the main frame, whereby rotation of the lens frame brings a selected lens of the lens body into alignment with the eye; said lens frame is captured within the circumferentially extending lens holder that is supported on said main body, said lens frame having an outer rim that can be rotated to thereby rotate the lens body within said lens holder of said main frame;

there are a pair of said lens bodies and said lens frames, each said lens frame has an outer peripheral edge portion attached to an outer cog; a gear simultaneously engaging each of the outer cogs;

whereby, rotation of the gear concurrently imparts rotation into each said lens body.

2. Eye glasses having a lens body; said lens body having multiple lenses formed thereon that can be brought in front of the eye for enhancing vision; a main frame;

said lens body is captured within a circumferentially extending lens holder, said lens holder having an outer rim that can be engaged and rotated to concurrently rotate the lens body and said rim;

said lens holder is slidably captured for rotation within a circumferentially extending channel of said main frame; said lens holder has an outer peripheral edge portion attached to an outer cog; a gear simultaneously engaging the outer cog of each lens holder so that different lenses of said lens body can selectively be brought in front of the eye for enhancing vision;

said lens holder is affixed to the outer marginal edge portion of the lens body and extends away therefrom whereby it can be engaged by the cog to directly rotate each of the lens;

whereby, rotation of the gear imparts rotation into each of said cogs to cause the lens bodies to simultaneously rotate in the same direction of rotation.

3. Rotatable, multiple lens eye glasses; said eye glasses having a main frame by which a pair of lens bodies are supported and by which the eye glasses can be worn by a person;

said frame includes a pair of U-shaped channel members circumferentially extending and rotatably receiving said lens body therewithin;

said lens body having a plurality of magnifying lenses formed thereon, whereby rotation of the lens body brings a selected lens into alignment with the eye;

said lens body is captured within a circumferentially extending lens holder, said lens holder having an outer rim that can be rotated to thereby rotate the lens body within the U-shaped channel member;

there are two axially aligned lenses in each said lens holder; means by which one lens can be rotated respective to the other;

said lens holder is affixed to the outer marginal edge portion of said lens body and extends away therefrom, said lens holder is slidably captured for rotation within a circumferentially extending channel and can be engaged within said U-shaped channel member;

said lens holder has an outer peripheral edge portion attached to an outer cog; a gear simultaneously engaging the outer cog of each lens holder; said lens body has a multiplicity of lenses formed thereon that commence at a common point on the lens and extend outwardly toward said rim; said lens body is rotatable with respect to said frame and therefore, any desired power lenses can be selectively brought in front of the eye for enhancing vision;

said frame rotatably receives said lens body within said circular channel within which said lens body is rotatably received in a slidable manner, whereby rotation of the gear directly imparts rotation into each said lens body.

4. The eye glasses of claim 3 wherein an outer lens is a trifocal having a far, intermediate, and near power lens formed thereon and located respective to the frame whereby rotation brings one of a selected power into alignment with the eyes.

* * * * *

UNITED STATES PATENT AND TRADEMARK OFFICE
CERTIFICATE OF CORRECTION

PATENT NO. : 4,948,244
DATED : AUGUST 14, 1990
INVENTOR(S) : BILLY R. JONES

It is certified that error appears in the above-identified patent and that said Letters Patent is hereby corrected as shown below:

Column 3, line 13, numeral "50" should read --60-- .

Column 4, line 16, "Fig. 6" should read --Fig. 6A-- ;
　　　　　Line 21, --Fig. 6B-- should be inserted after "310" .

Column 6, line 20, insert --said two axially aligned lenses include-- after "wherein" and delete "is" ;
　　　　　Line 21, insert --made into-- before "a", first occurrence;
　　　　　Line 23, insert --of said outer lens-- after "rotation" .

Signed and Sealed this

Tenth Day of March, 1992

Attest:

HARRY F. MANBECK, JR.

*Attesting Officer*　　　*Commissioner of Patents and Trademarks*